United States Patent
Bi et al.

(10) Patent No.: US 9,536,535 B2
(45) Date of Patent: Jan. 3, 2017

(54) DECODING WIRELESS IN-BAND ON-CHANNEL SIGNALS

(75) Inventors: Dongsheng Bi, Fremont, CA (US); Binuraj Ravindran, Cupertino, CA (US); Bassel Haddad, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 347 days.

(21) Appl. No.: 13/977,640

(22) PCT Filed: Mar. 30, 2012

(86) PCT No.: PCT/US2012/031367
§ 371 (c)(1),
(2), (4) Date: Jun. 28, 2013

(87) PCT Pub. No.: WO2013/147830
PCT Pub. Date: Oct. 3, 2013

(65) Prior Publication Data
US 2014/0012570 A1 Jan. 9, 2014

(51) Int. Cl.
*H04L 27/06* (2006.01)
*G10L 19/16* (2013.01)
(Continued)

(52) U.S. Cl.
CPC .......... *G10L 19/167* (2013.01); *H04H 20/426* (2013.01); *H04N 7/24* (2013.01);
(Continued)

(58) Field of Classification Search
CPC ...................................................... H04N 7/24
(Continued)

(56) References Cited

U.S. PATENT DOCUMENTS 5,623,684 A * 4/1997 El-Ghoroury ....... G06F 15/7867
712/1
6,480,545 B1 * 11/2002 Symes ..................... H04N 5/46
348/432.1

(Continued)

FOREIGN PATENT DOCUMENTS

WO 2008/051891 A2 5/2008

OTHER PUBLICATIONS

International Search Report and Written opinion received for PCT Application No. PCT/US2012/031367, mailed on Nov. 16, 2012, 11 pages.

(Continued)

*Primary Examiner* — Lihong Yu
(74) *Attorney, Agent, or Firm* — Sutherland Asbill & Brennan LLP (57) ABSTRACT

Described herein are systems, methods and apparatus for decoding in-band on-channel signals and extracting audio and data signals. Memory requirements are reduced by selectively filtering a bit stream of data in the signal so that services of interest which are encoded therein are processed. A single pool of memory may be shared between physical layer and data link layer processing. Memory in this pool may be allocated dynamically between processing of data at the physical and data link layers. When the available memory is not sufficient to support the required services, the dynamic allocation allows for graceful degradation.

9 Claims, 7 Drawing Sheets

(51) Int. Cl.
  *H04N 7/24*    (2011.01)
  *H04N 21/438*  (2011.01)
  *H04H 20/42*   (2008.01)
  *H04N 21/443*  (2011.01)

(52) U.S. Cl.
  CPC ..... *H04N 21/4382* (2013.01); *H04H 2201/18* (2013.01); *H04N 21/4435* (2013.01); *H04N 2007/246* (2013.01)

(58) Field of Classification Search
  USPC ........................................................ 375/316
  See application file for complete search history.

(56) References Cited

U.S. PATENT DOCUMENTS

| | | |
|---|---|---|
| 6,480,559 B1 | 11/2002 | Dabak |
| 8,595,748 B1* | 11/2013 | Haggerty ................ H04W 4/18 455/466 |
| 2002/0024944 A1 | 2/2002 | Zhang et al. |
| 2005/0220110 A1 | 10/2005 | Agarwal |
| 2006/0041820 A1* | 2/2006 | Hang .................... H04L 1/0045 714/758 |

OTHER PUBLICATIONS

HD Radio Air Interface Design Description Layer 1 FM, iBiquity Digital Corporation, Rev. F., Aug. 7, 2007, pp. 1-131.

\* cited by examiner

DECODING WIRELESS IN-BAND ON-CHANNEL SIGNALS

TECHNICAL FIELD

This disclosure relates generally to decoding wireless in-band on-channel signals.

BACKGROUND

Decoding of in-band on-channel ("IBOC") signals to extract data utilizes memory, and processing resources.

DETAILED DESCRIPTION

Figure 1:
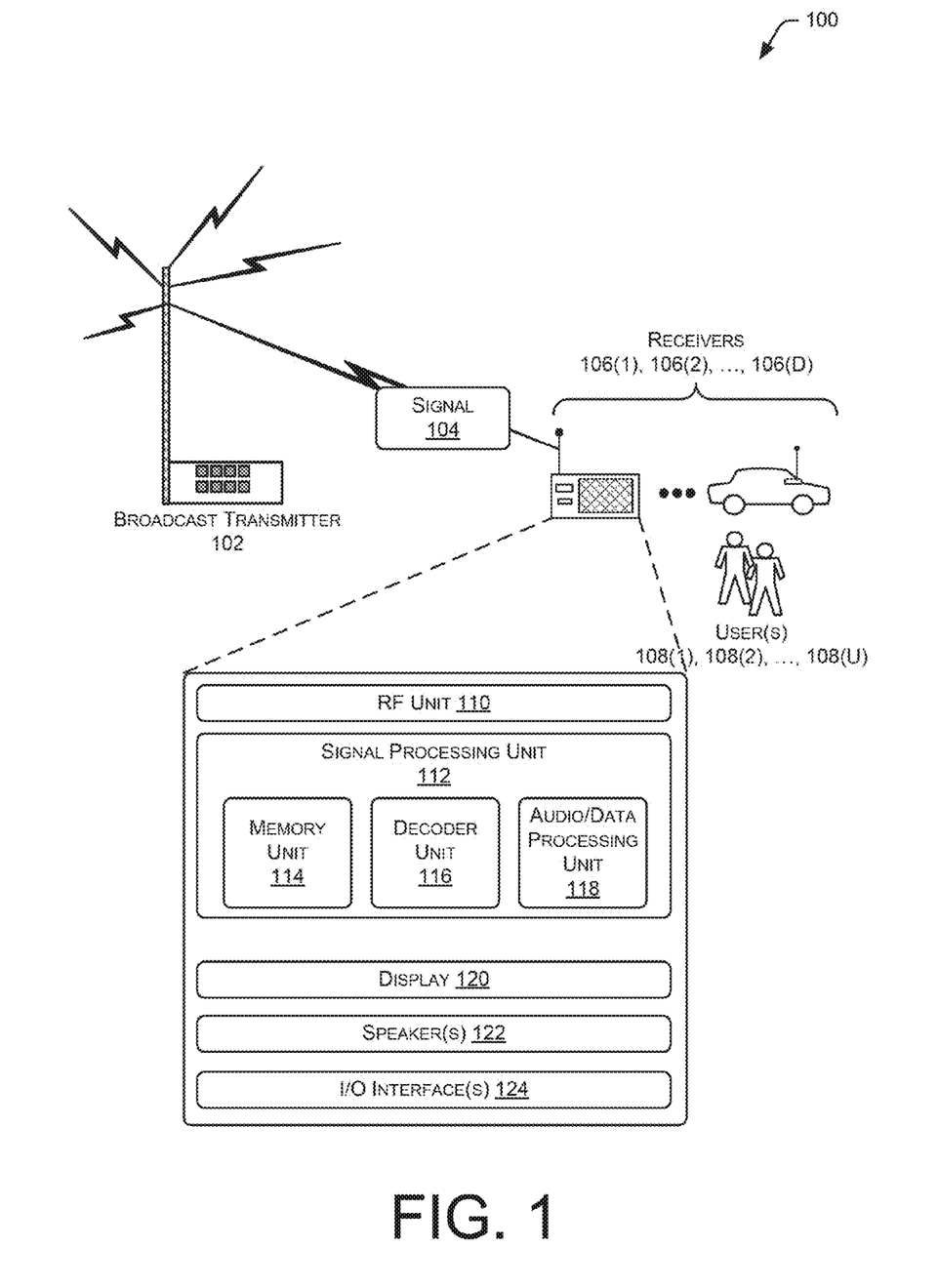
FIG. 1 illustrates a system for decoding in-band on-channel signals.

FIG. 1 illustrates a system 100 for decoding in-band on-channel signals ("IBOC"). A broadcast transmitter 102 is shown emitting a signal 104. The broadcast transmitter 102 may be configured to emit a signal 104 which is amplitude modulated, frequency modulated, phase modulated, and so forth. The signal 104 may comprise an analog signal and one or more digitally modulated sidebands In another implementation, the signal 104 may comprise a digitally modulated signal.

The signal 104 carries at least one bit stream of digital data. This bit stream may be encoded using analog techniques, digital techniques, or a combination thereof. The techniques may provide for error correction, resistance to adverse channel conditions such as fading, data compression, and so forth. In one implementation, the signal 104 may be compliant with one or more standards set forth by the National Radio Systems Committee ("NRSC") located in the United States and co-sponsored by the National Association of Broadcasters and the Consumer Electronics Association. For example, the signal 104 may be broadcast according to the HD Radio™ air interface promulgated by the NRSC. HD Radio™ is a trademark of iBiquity Digital Corporation of the United States.

In some implementations, the signal 104 may include data generated using analog and digital modulations. The bit stream is generated by a physical layer (or "layer 1") interface for use by the broadcast transmitter 102 to generate the signal 104. The bit stream of data in the signal 104 may carry digital information including, but not limited to, digital audio and data. For example, the signal 104 may have an analog signal of a talk radio station as well as a digital audio of a music station and traffic data for use by in-vehicle navigation systems. Thus, one bit stream may carry several different services.

This signal 104 may be received by one or more receivers 106(1), 106(2), . . . , 106(D). These receivers 106 may include portable radios, in-vehicle entertainment systems, smartphones, laptops, netbooks, mobile handsets, and so forth. The receiver 106 is configured to present at least a portion of the information contained in the signal 104 to one or more users 108(1), 108(2), . . . , 108(U), or another device. For example, the receiver 106 may be configured to demodulate and decode the digital audio of the music station into an audible signal for output by a speaker, as well as providing the traffic data to the in-vehicle navigation system.

A physical layer interface in the receiver 106 may comprise an RE unit 110 and a signal processing unit 112. The RF unit 110 is configured to provide for reception of one or more radio frequency signals at one or more frequencies, such as the signal 104. The RF unit 110 may comprise an amplifier, a mixer, a local oscillator, and so forth. The RE unit 110 may be implemented as discrete electronic components, integrated circuits, software-defined radio, or a combination thereof.

The signal processing unit 112 comprises a memory unit 114 and a decoder unit 116 and audio/data processing unit 118. The memory unit 114 is configured to store one or more bits for subsequent retrieval. The memory unit 114 may comprise random access memory ("RAM"), non-volatile memory, solid state memory, magnetic memory, semiconductor memory, and so forth. The memory unit 114, in turn, comprises a plurality of addresses or memory locations within which data may be stored and retrieved. The decoder unit 116 is configured to decode signals received by the RE unit 110. The audio/data processing unit 118 extracts audio or data service information from output of the decoder unit 116. Audio services may be decompressed by the audio/data processing unit 118 to pulse code modulated ("PCM") samples. At least a portion of these PCM samples may be presented to the user through speakers. Data services are processed by the audio/data processing unit 118, and at least a portion of the output may be presented on a display or provided to another unit for further processing.

The signal processing unit 112 may be configured such that at least the memory unit 114 and the decoder unit 116 are disposed on a common integrated circuit die. In another implementation, the memory unit 114 may be integral with the decoder unit 116. In one implementation, the memory unit 114 may be less than or equal to about 300 kilobytes. In some implementations, the RE unit 110, the signal processing unit 112, and other components of the receiver 106 may be combined or shared.

In some implementations, the receiver 106 may comprise a processor not shown having one or more cores and configured to access and execute at least in part instructions stored in one or more memories coupled to the processor to perform certain actions or functions. These one or more memories comprise one or more computer-readable storage media ("CRSM"). The one or more memories may include, but are not limited to, random access memory ("RAM"), flash RAM, magnetic media, optical media, and so forth. The one or more memories may be volatile in that information is retained while providing power or non-volatile in that information is retained without providing power. This processor may be used in conjunction with the signal processing unit 112, may provide other functions, or both.

A display 120 may be incorporated into the receiver 106 which is configured to present visual information to the user 108. The display 120 may comprise one or more liquid crystal displays, plasma displays, cathode ray tubes, light-emitting diodes, and so forth. The display 120 may be used to present information in the signal 104 as received and decoded by the signal processing unit 112. For example, where the signal 104 includes the digital audio of the music station, the display 120 may provide a name of the song currently being broadcast and the artist performing as provided by the audio/data processing unit 118.

One or more speakers 122 may also be provided. These speakers 122 are configured to accept a signal generated by the signal processing unit 112, such as PCM samples, and present sound to the user. For example, the signal processing unit 112 may output a signal to drive the speakers 122, generating an audible representation of at least a portion of the data in the signal 104.

The receiver 106 may also incorporate one or more input/output interfaces 124. These I/O interfaces 124 allow for coupling devices such as keyboards, joysticks, touch sensors, cameras, microphones, speakers, external memories, navigation devices, and so forth to the receiver 106. For example, a serial peripheral interface ("SPI") may be provided to transfer traffic data present in the signal 104 to a navigation device.

The receiver 106 may be installed in or integrated with other devices. For example, in one implementation, the receiver 106 may be part of a smartphone, a vehicle entertainment system, and so forth. The receiver 106 may also share one or more components with other devices. For example, when integrated into a smartphone, the display, speakers, touch sensors, and so forth associated with the smartphone may be used to present data from the signal processing unit 112, receive user input, and so forth.

Figure 2:
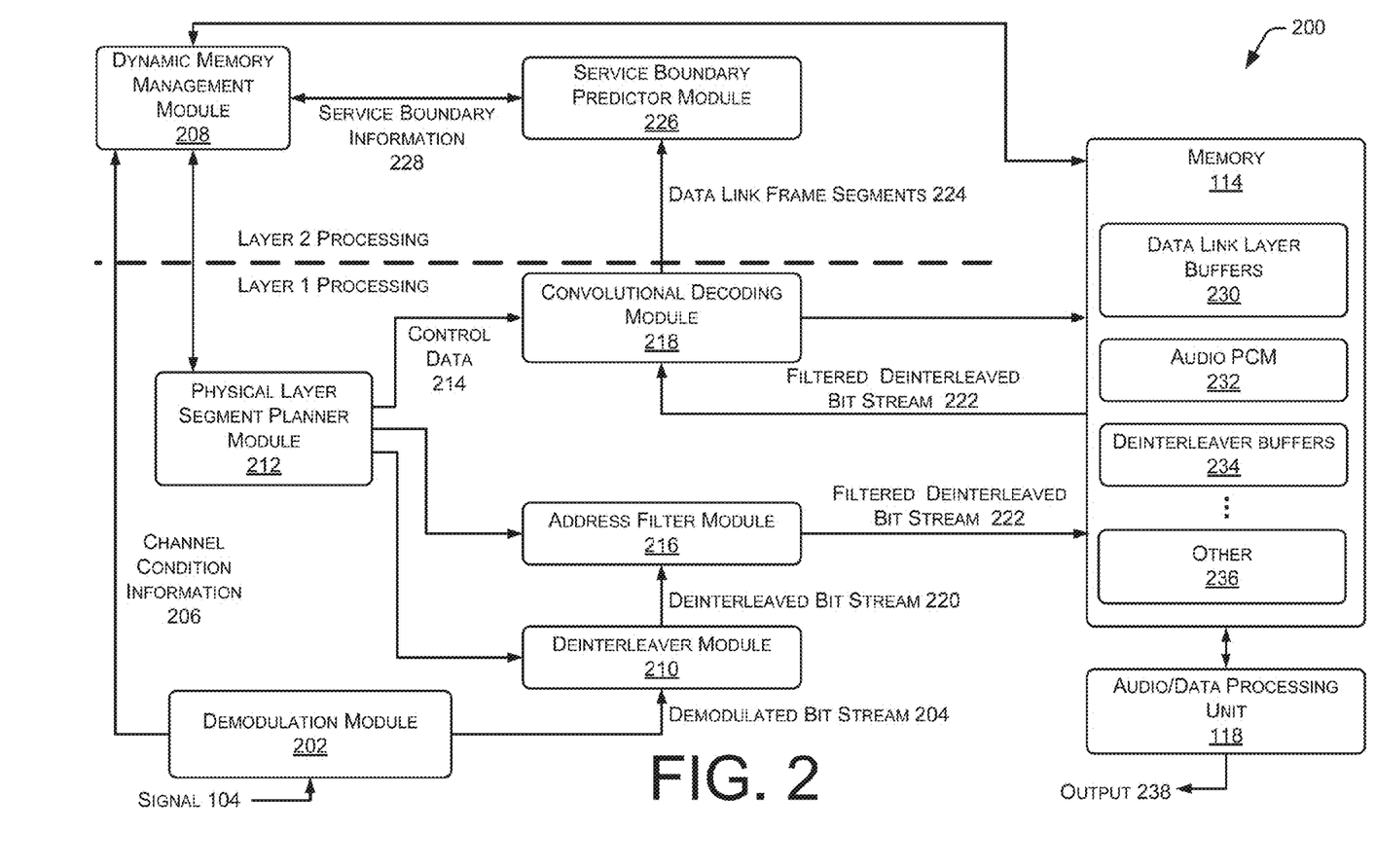
FIG. 2 illustrates a block diagram of modules in a signal processing unit for processing in-band on-channel signals in accordance with an embodiment of the disclosure.

FIG. 2 illustrates a block diagram 200 of modules in one implementation of the signal processing unit 112. For illustrative purposes, and not by way of limitation, the modules and associated data may be referred to as operating at a physical layer (or "layer 1") or a data link layer (or "layer 2"). Also for illustrative purposes, and not by way of limitation, the modules herein are shown interconnected in one configuration. In other implementations, other interconnection configurations may be used. The following modules may be implemented as application-specific integrated circuits ("ASICs"), field programmable gate arrays ("FPGAs"), software-defined radios ("SDRs") executing on a processor, and so forth. The modules described herein may be implemented as a plurality of circuit elements on a single integrated circuit die.

A demodulation module 202 is configured to accept the signal 104 after processing by the RF unit 110 and extract information. The demodulation module 202 is configured to be complementary to the signal 104, such that at least a portion of the information contained therein may be extracted. In one implementation, the demodulation module 202 may be configured to demodulate an orthogonal frequency-division multiplexed ("OFDM") signal. The demodulation module 202 is configured to output a demodulated bit stream 204.

The demodulation module 202 may be configured to provide channel condition information 206 to a dynamic memory management module 208. The channel condition information 206 comprises data describing a radio channel associated with the signal 104. For example, the channel condition information 206 may indicate a good channel, a fading channel, and so forth. The dynamic memory management module 208 is configured to manage memory allocation for use during decoding of the received signal. This allocation may be administered in a prioritized fashion. Operation of the dynamic memory management module 208 is discussed in more detail in relation to the following modules.

A deinterleaver module 210 is coupled to the demodulation module 202. The deinterleaver module 210 accepts the demodulated bit stream 204 and is configured to deinterleave data therein. Interleaving of blocks of data in frequency and time may be done for a variety of reasons. For example, interleaving mitigates effects of interference in the radio channel associated with the signal 104. The deinterleaver module 210 may be configured to deinterleave one or more different interleaving formats. These formats may include block interleaving, convolutional interleaving, and so forth. The deinterleaver module 210 may be coupled to a physical layer segment planner module 212.

The physical layer segment planner module 212 is configured to provide control data 214 to the deinterleaver module 210, an address filter module 216, a convolutional decoding module 218, or a combination thereof. The physical layer segment planner module 212 may also be configured to translate addresses obtained in service boundary information into corresponding deinterleaved addresses. Operation and functionality of the physical layer segment planner module 212 are discussed in more detail below.

The deinterleaver module 210 outputs a deinterleaved bit stream 220 to the address filter module 216. The address filter module 216 is configured to receive deinterleaved addresses of a service of interest from the physical layer segment planner module 212 and select bits from the bit stream, such as the deinterleaved bit stream 220, based at least in part on the deinterleaved addresses. The deinterleaved addresses comprise data about locations of segments associated with one or more services of interest in the bit stream which is still at least partially convolutionally encoded.

The bits selected by the address filter module 216 form the filtered deinterleaved bit stream 222 which may then be stored in the memory unit 114 or otherwise made accessible to the convolutional decoding module 218. When no addresses are available to filter by, in one implementation, all data is passed without filtering. For example, when the signal processing unit 112 is first started and no services have been selected or designated as services of interest, the address filter module 216 might pass the deinterleaved bit stream 220 without modification. In another implementation, an assumption may be made about a service of interest, such as a primary channel of digital audio, which may be initially selected and used for filtering.

In some implementations, the address filter module 216 may be integrated with or otherwise combined with the deinterleaver module 210. For example, the deinterleaver module 210 may be configured to disregard during deinterleaving the addresses selected for filtering.

By filtering the deinterleaved bit stream 220 to form the filtered deinterleaved bit stream 222, the amount of data to be stored and processed is correspondingly reduced. One result of this reduction is that the amount of memory unit 114 physically present in the signal processing unit 112 may be less than that required by traditional decoders wherein the entire physical layer packet is decoded. This reduction in memory, in turn, results in a smaller physical size of the memory unit 114 when constructed on an integrated circuit, reducing the on-die footprint of the signal processing unit 112. Reductions in processor utilization, power consumption, and so forth may also be realized due to the reduced volume of data in the filtered deinterleaved bit stream 222 compared to the deinterleaved bit stream 220.

The convolutional decoding module 218 is configured to decode data which has been encoded using a convolutional algorithm or process. In some implementations, the convolutional decoding module 218 may retrieve the filtered deinterleaved bit stream 222 from the memory unit 114. In one implementation, the convolutional decoding module 218 may be configured to use Viterbi decoding. The convolutional decoding module 218 produces a stream of data link frame segments 224 (or layer 2). The convolutional decoding module 218 may receive control data 214 from the physical layer segment planner module 212. This control data 214 may instruct the convolutional decoding module 218 to make changes such as reconfiguring a Viterbi block to use and/or apply different number of soft bits per each segment.

The service boundary predictor module 226 receives the stream of data link frame segments 224. Each of the frame segments carries information associated with a particular service within the signal 104. As mentioned above, IBOC systems may provide multiple services within the signal 104. Data for a given service is presented in one or more segments. Thus, the size and number of segments for a given service may be different.

The service boundary predictor module 226 receives from the convolutional decoding module 218 a bit stream of data link frame segments 224 comprising at least one service of interest and one or more other services. For example, the bit stream may include a first, second, and third services. The first service may carry digital audio of classical music, the second service may carry digital audio of jazz music, and the third service may carry traffic reports.

The service boundary predictor module 226 receives a designation of the at least one service of interest. For example, the user 108 may select the second service carrying jazz music using controls on the receiver 106. In some implementations, multiple services of interest may be selected. Continuing the example, the user 108 may also select that the third service of traffic reports is also of interest.

The service boundary predictor module 226 determines predicted end points of segments within the bit stream of the frame segments associated with the designated at least one service of interest. As used herein, "end points" refer to points at which a segment begin or complete. Continuing the example, the segments associated with the jazz music service and the traffic reports are determined. In some implementations, the end points may be updated to include more than the actual number of bits required for the service of interest, to prevent loss of data associated with the service of interest which may occur due to timing errors, jitter, interference, segment size changes and so forth. This may be referred to as "padding" the end points.

The service boundary predictor module 226 may be configured to predict boundaries of the segments associated with the at least one service of interest using a pre-determined set of boundaries. For example, in one implementation, initial service conditions may be assumed to use data encoded at 96 kilobits per second (kbit/s). This estimate may then be used to determine a data link layer, or layer 2, protocol data unit associated with a service. In some implementations, the service boundary predictor module 226 may be configured so that service boundaries are determined by applying a plurality of iterations. Service boundary information 228 is generated by the service boundary predictor module 226. The service boundary information 228 comprises the predicted end points of the designated at least one service of interest within the bit stream of frame segments. For example, the service boundary information 228 may specify that the segments associated with the second service of jazz music start at bits 5000, 11000, 17000, and so forth, and each segment is 3200 bits long.

The service boundary predictor module 226 may be configured to generate service boundary information 228 continuously, on demand, or a combination thereof. For example, the service boundary predictor module 226 may be called to generate the service boundary information 228 when the RF unit 110 changes frequencies, and discontinue generation of service boundary information once a pre-determined level of confidence has been achieved in the predicted boundaries in the service boundary information 228.

The dynamic memory management module 208 receives the service boundary information 228. As described above, the dynamic memory management module 208 is in communication with one or more modules such as the memory unit 114, the demodulation module 202, the physical layer segment planner module 212, and so forth. The dynamic memory management module 208 is configured to receive the service boundary information 228, as well as the functions described next.

The dynamic memory management module 208 coordinates allocation of addresses within the memory unit 114 for the storage of data. By controlling allocation of the memory unit 114, the amount of the memory unit 114 used in operation may be reduced. Allocation of the memory unit 114 may be made based on pre-determined priorities. These priorities may take into account types of service, quality of service, and so forth. For example, priorities may be configured such that audio services are given first priority, followed by data services. This data may include one or more of data link layer buffers 230 audio pulse code modulation ("PCM") data 232, deinterleaver buffers 234, and other data 236.

The dynamic memory management module 208 may, at least partly in response to prioritization, allocate portions of the memory unit 114 for audio PCM data 232, data link layer buffers 230 deinterleaver buffers 234. The amount of memory unit 114 allocated for the deinterleaver module 210, the convolutional decoding module 218, or both may be based at least in part on the current channel condition information 206. Once these allocations have been made, remaining memory may be allocated for decoding other services, such as data services.

By filtering the bit stream to work with only the one or more designated services of interest, memory and processing requirements may be reduced. Memory reductions are realized because the dynamic memory management module 208 allocates memory among both physical layer ("layer 1") and data link layer ("layer 2") processing in the memory unit 114, which reduces otherwise duplicative or under-allocated hardware. The filtering also reduces the amount of data to be processed. As a result, in one implementation, only a portion of a complete physical layer frame is stored in the memory unit 114 during operation.

In some implementations, the memory unit 114 may be insufficient for all operations demanded. For example, should the user 108 select to have all services in the signal 104 decoded, there may be insufficient memory for audio data 232, deinterleaver buffers 234, and so forth. In these situations, the dynamic memory management module 208 may be configured to change the memory resource allocation to provide a graceful degradation in service, performance, or both. These changes to the memory resource allocation by the dynamic memory management module 208 may be configured to maintain a pre-determined quality of service. For example, a particular audio service may be designated such that it is to be provided at a highest available bit-rate. Thus, the memory may be allocated to maintain this highest available bit-rate at the expense of degrading other services.

The audio/data processing unit 118 may access the information stored in the memory unit 114 and provide output 238. This output 238 may be presented on the display 120, the speakers 122, and so forth.

Figure 3:
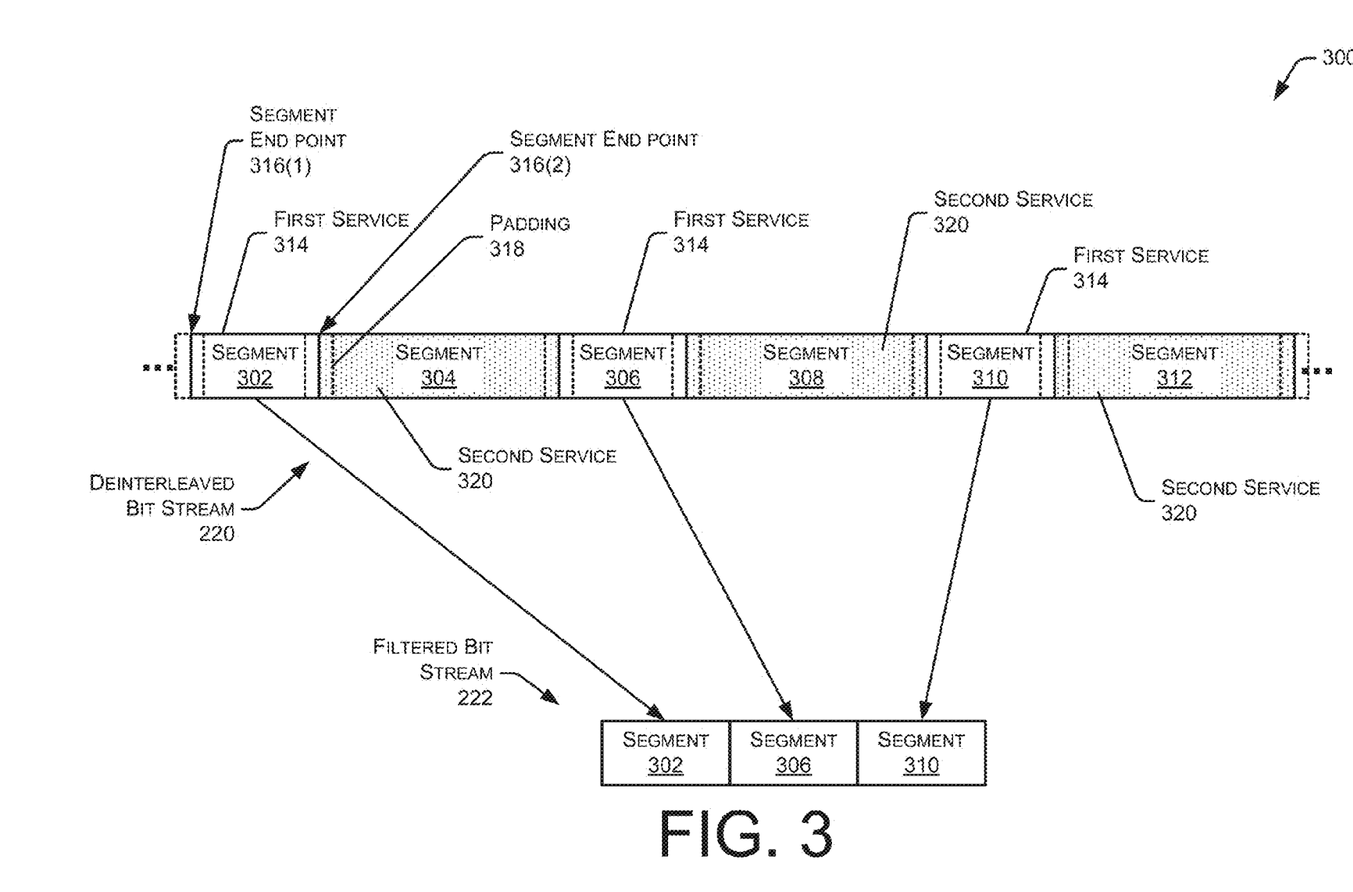
FIG. 3 illustrates a filtered bit stream of the in-band on-channel signals accordance with an embodiment of the disclosure.

FIG. 3 illustrates a bit stream 300 of the IBOC signal 104. A portion of the deinterleaved bit stream 220 derived from the demodulated signal 104 is shown. This portion is made up of segments 302, 304, 306, 308, 310, and 312. For ease of illustration, and not by way of limitation, two services are depicted and all the services are assumed to be coming from the same logical channel. It is possible that the segments for a given service may span across multiple logical channels. A first service 314 is provided by the data in segments 302, 306, and 310. Each segment has two end points, 316(1) and 316(2) indicating where that segment begins and ends. Additional bits to either side of the end points may be included, providing padding 318. A second service 320 is provided by the data in segments 304, 308, and 312. While the segments 302, 304, 306, 308, and so forth are shown with the first service 314 and the second service 320 alternating, in other implementations, other arrangements may be used. For example, a cluster of first service 314 segments may be grouped so that the deinterleaved bit stream 220 has the sequence of 302, 306, 304, 310, 308, 312.

As shown at the bottom of FIG. 3, after processing by the address filter module 216, the resulting filtered deinterleaved bit stream 222 is significantly reduced in size compared to the deinterleaved bit stream 220. The filtered deinterleaved bit stream 222 reflects the one or more services designated by the user 108, another device, or by instructions executing on a processor. As a result of this size reduction and the dynamic memory management module 208, less memory is required during operation of the signal processing unit 112.

Figure 4:
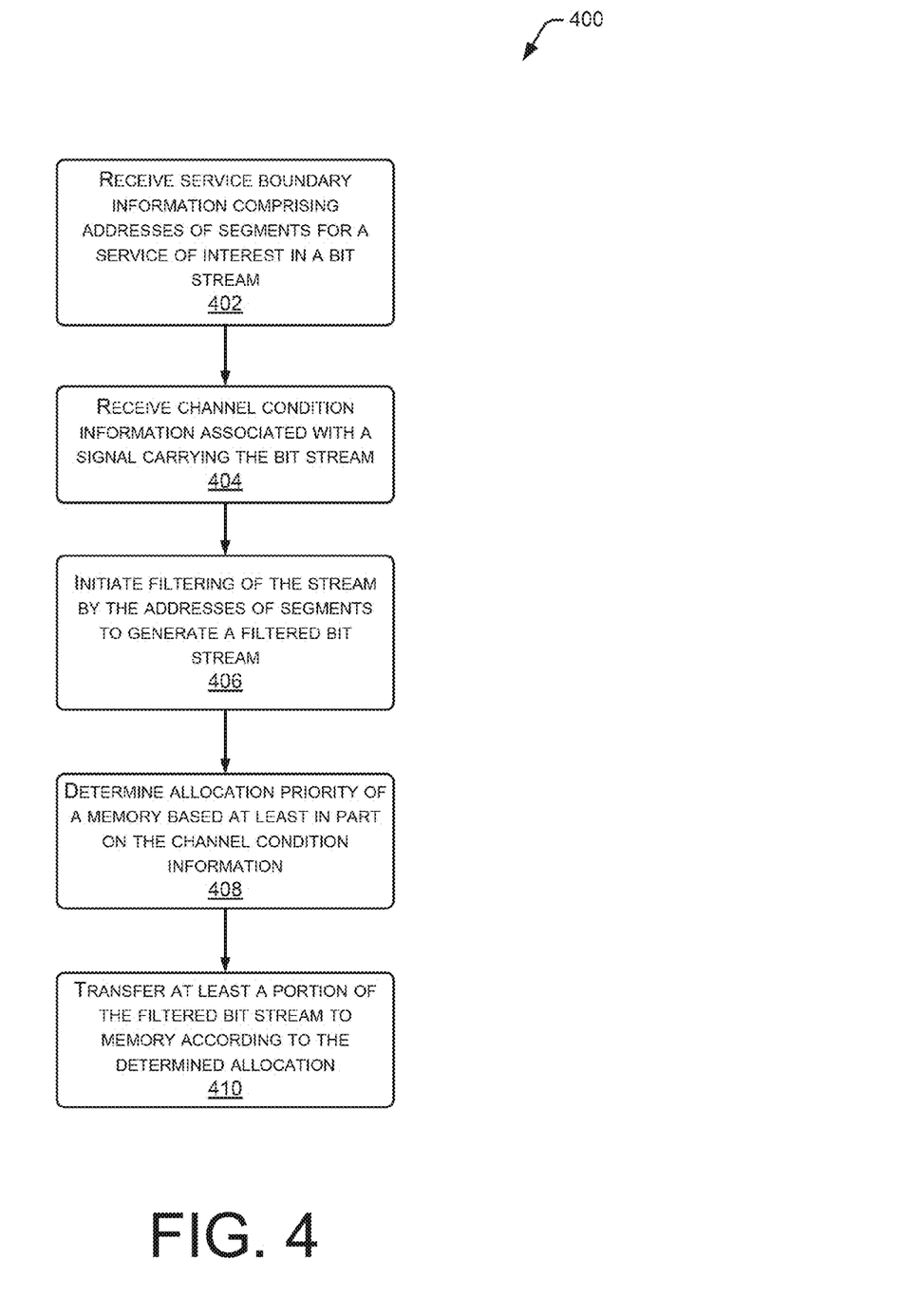
FIG. 4 illustrates a flow diagram of a process of dynamic memory management in accordance with an embodiment of the disclosure.

FIG. 4 illustrates a flow diagram 400 of a process of dynamic memory management in accordance with an embodiment of the disclosure. In some implementations, the dynamic memory management module 208 may implement the following operations.

Block 402 receives service boundary information 228 from the service boundary predictor module 226. The service boundary information 228 provides addresses of segments for one or more services of interest in a bit stream 204 of data. This bit stream 204 of data may be provided by the demodulation module 202. In some implementations, the demodulation module 202 may be configured to demodulate orthogonal frequency division multiplexed signals.

Block 404 receives channel condition information 206 from the demodulation module 202. The channel condition information 206 is associated with a signal 104 carving the bit stream 204. This channel condition information 206 may include good channel, fading channel, noise level, and so forth.

Block 406 initiates filtering by the address filter module 216 of the bit stream based at least in part on the addresses of segments in the service boundary information 228. This filtering results in a filtered deinterleaved bit stream 222.

Block 408 determines allocation priority of memory unit 114. This allocation priority may be based at least in part on the channel condition information. For example, the number of soft bits for the deinterleaver buffers 234, and so forth may be based at least in part on channel condition. For example, where channel conditions are poor, a higher number of soft bits may be allocated during deinterleaving and deconvolution to recover the desired data.

During the start up, when service information is unavailable, block 408 may allocate the memory according the channel conditions. For example, when channel conditions are deemed good, less memory may be assigned for deinterleaver buffers (hence a lower number of soft bits) and more memory for data link layer buffers 230 to provide faster acquisition of service boundary information. When channel conditions are deemed poor, block 408 may allocate more memory for deinterleaver buffers to provide good quality of service. As a result, the service boundary information may take several iterations to acquire.

Memory allocation priority may be pre-determined, dynamically determined, or a combination thereof. Priorities may be specified based on service type, and so forth. For example, priorities may be configured so that audio information is given first priority, then data service. The allocation priority may be configured to provide for graceful degradation when demands for the memory unit 114 exceed capacity. When channel condition is deemed good, block 408 may assign number of soft bits sufficient to achieve best quality of service for the higher priority service and the memory left may be used for decoding the lower priority service. When channel condition worsens, the number of soft bits used for the higher priority service may be increased to maintain the quality of service. Meanwhile the number of soft bits used for lower priority service may be reduced, or the lower priority service may be dropped. For example, audio may be assigned a higher priority than data, resulting in graceful degradation on the data service when channel conditions worsen. In another example, core audio data may be assigned higher priority than enhanced audio data, resulting in graceful degradation on the audio during poor reception.

Block 410 transfers at least a portion of the filtered deinterleaved bit stream 222 to the memory unit 114 according to the determined allocation. The convolutional decoding module 218, and/or other modules may access the memory unit 114 to retrieve the filtered deinterleaved bit stream 222 for processing.

Figure 5:
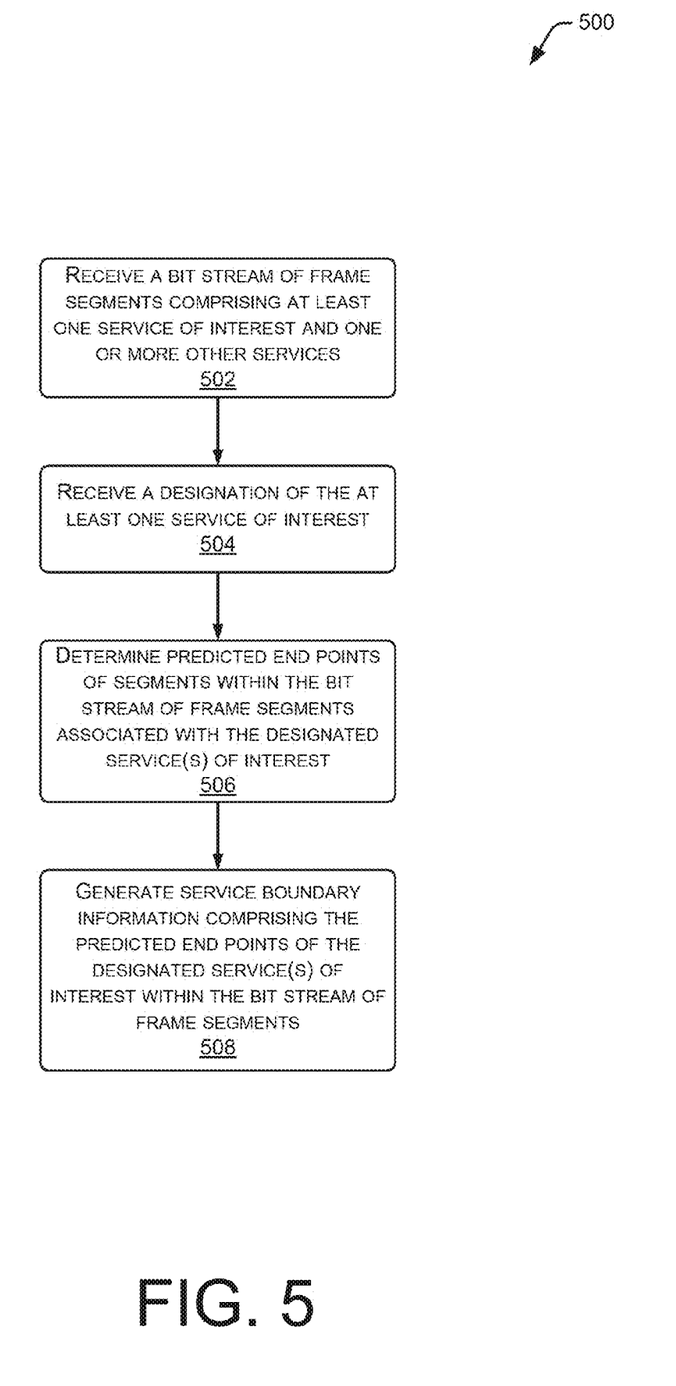
FIG. 5 illustrates a flow diagram of a process of predicting boundaries of segments of a service of interest in accordance with an embodiment of the disclosure.

FIG. 5 illustrates a flow diagram 500 of a process of predicting boundaries of segments of a service of interest in accordance with an embodiment of the disclosure. In some implementations, the following operations may be provided by the service boundary predictor module 226.

Block 502 receives from the convolutional decoding module 218 the bit stream of data link frame segments 224 comprising at least one service of interest and one or more other services. For example, upon the initial start-up of the signal processing unit 112, the address filter module 216 is configured to pass the deinterleaved bit stream 220 without filtering.

Block 504 receives a designation of the at least one service of interest. For example, the user 108 may use a control on the receiver 106 to select a service carrying digital audio of jazz music. In some implementations, another device or process executing on a processor may designate at least one service of interest. For example, a navigation system coupled to the receiver 106 may be configured to generate a signal that, when received by the receiver 106, designates traffic data be selected and provided to the navigation system.

Block 506 determines the predicted end points of segments within the bit stream of frame segments associated with the designated at least one service of interest. Predictions may be based on one or more initial conditions. These initial conditions may comprise initial service conditions which one or more of the services are assumed to use a typical data rate for audio and data services, thus predicting the segment locations.

Block 508 generates service boundary information 228 comprising the predicted end points of the designated at least one service of interest within the bit stream of frame segments. As described above, the dynamic memory management module 208 may use the service boundary information 228 to initiate filtering, by the address filter module 216.

Figure 6:
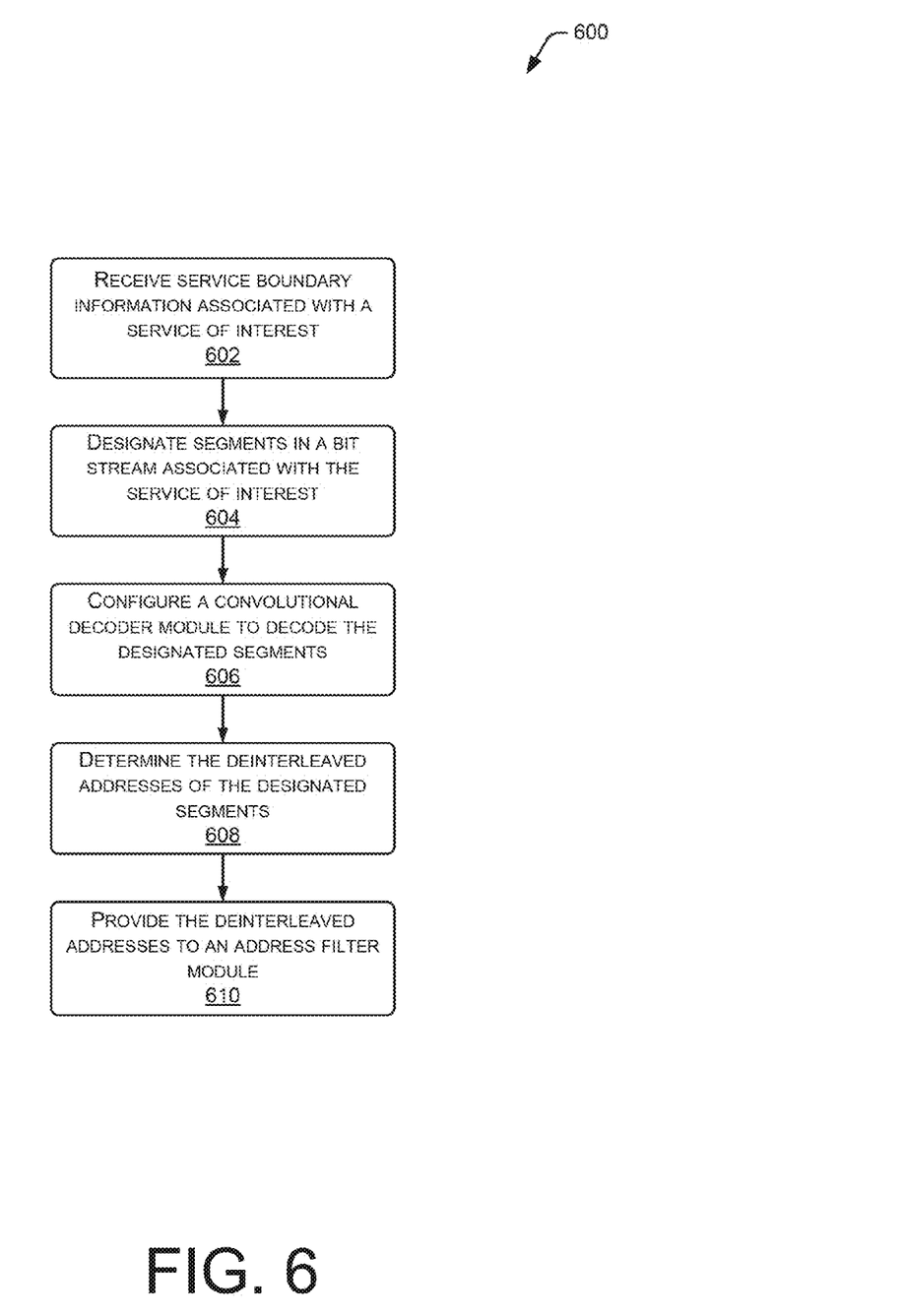
FIG. 6 illustrates a flow diagram of a process of physical layer segment planning in accordance with an embodiment of the disclosure.

FIG. 6 illustrates a flow diagram 600 of a process of physical layer segment planning in accordance with an embodiment of the disclosure. In some implementations, the following operations may be provided by the physical layer segment planner module 212.

Block 602 receives the service boundary information 228 associated with a service of interest such as, for example, the segment start and finish points for the service carrying digital audio of jazz music.

Block 604 designates segments in a bit stream associated with the service of interest using at least in part the service boundary information 228. Continuing the above example, the segment start and finish points are used to designate the segments of the service of interest in the deinterleaved bit stream 220.

Block 606 configures the convolutional decoding module 218 to decode the designated segments. This configuration may include setting a number of soft bits for deconvolution. In some implementations, the convolutional decoding module 218 may selectively decode the segments of interest. This selective decoding may reduce the amount of memory unit 114 used for buffers associated with the convolutional decoding.

Block 608 determines the deinterleaved addresses of the designated segments. The physical layer segment planner module 212 may be configured to translate the addresses for the one or more services of interest from the service boundary information 228 into corresponding deinterleaved addresses. For example, bits 11200 to 13760 in the data link layer frame segments 224 correspond to bits 27800 to 34600 in the deinterleaved bit stream 220, which allows additional bits to pass through the address filter because of the unknown initial state and traceback length used in a typical convolutional decoding.

Block 610 provides the deinterleaved addresses to the address filter module 216. As described next, these deinterleaved addresses may then be used to filter out at least a portion of the bit stream.

Figure 7:
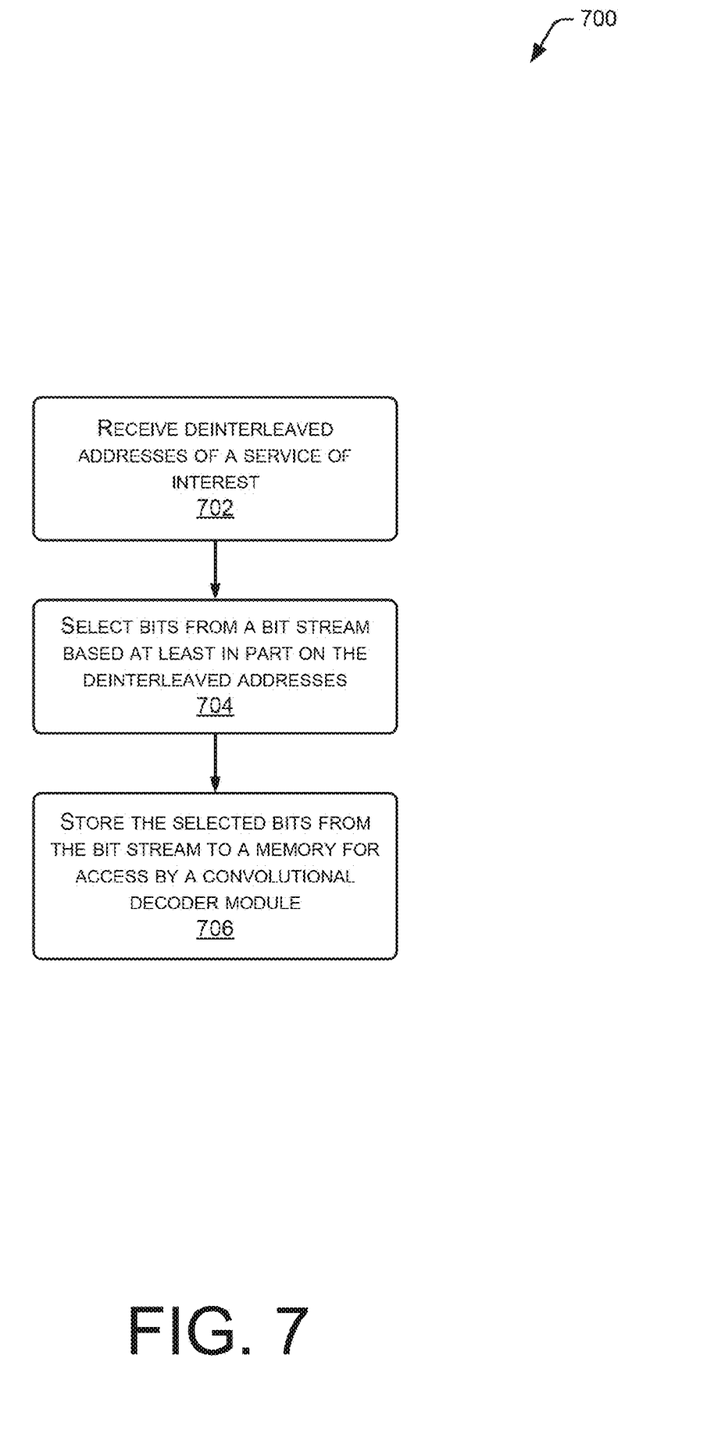
FIG. 7 illustrates a flow diagram of a process of filtering a bit stream of data in accordance with an embodiment of the disclosure.

FIG. 7 illustrates a flow diagram 700 of a process of filtering a bit stream of data in accordance with an embodiment of the disclosure. In some implementations, the following operations may be provided by the address filter module 216.

Block 702 receives the deinterleaved addresses of the at least one service of interest from the physical layer segment planner module 212, such as bits 8500 to 11060 in the deinterleaved bit stream 220.

Block 704 selects bits from a bit stream based at least in part on the deinterleaved addresses. For example, particular bits in the deinterleaved bit stream 220 may be selected. Non-selected bits may be disregarded in some implementations.

Block 706 stores the selected bits from the bit stream in the memory unit 114 coupled to the dynamic memory management module 208. As mentioned above the convolutional decoding module 218 may be configured to retrieve the selected bits from the memory for decoding. In another implementation, bits may be selected for discard, so that the deinterleaved addresses designate data which is not to be retained. In this implementation, the non-selected bits may then be stored in the memory unit 114.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus for decoding wireless signals, the apparatus comprising:
   a memory;
   a decoder coupled to the memory, the decoder comprising:
      a demodulation module;
      a physical layer segment planner module;
      a deinterleaver module coupled to the physical layer segment planner module, wherein the deinterleaver module receives control data from the physical layer segment planner module;
   an address filter module coupled to the physical layer segment planner module and the deinterleaver module, wherein the address filter module receives deinterleaved addresses of a service of interest from the physical layer segment planner module and a deinterleaved bit stream from the deinterleaver module;
   a convolutional decoding module coupled to the physical layer segment planner module, wherein the convolutional decoding module receives control data from the physical layer segment planner module;
   a service boundary predictor module coupled to the convolutional decoding module, wherein the service boundary predictor module receives a bit stream of data link frame segments from the convolutional decoding module; and
   a dynamic memory management module that:
      is coupled to:
         a demodulation module, wherein the dynamic memory management module receives channel condition information from the demodulation module and
         the service boundary predictor module, wherein the dynamic memory management module receives service boundary information, comprising addresses of segments for a service in a bit stream of data, from the service boundary predictor module;
      manages allocation of the memory;
      receives channel condition information, from the demodulation module, associated with a signal carrying the bit stream data;
      initiates filtering, by the address filter module, of the bit stream by an address of a segment to generate a filtered bit stream; and
      determines allocation priority of the memory based at least in part on the channel condition information.

2. The apparatus of claim 1, wherein the memory stores at least data link layer buffers, audio pulse code modulated data, deinterleaver buffers, or a combination thereof.

3. The apparatus of claim 1, wherein the service boundary predictor module:
   receives from the convolutional decoding module a bit stream of frame segments comprising at least one service of interest and one or more other services;
   receives a designation of the at least one service of interest;
   determines predicted end points of segments within the bit stream of frame segments associated with the designated at least one service of interest; and
   generates service boundary information comprising the predicted end points of the designated at least one service of interest within the bit stream of frame segments.

4. The apparatus of claim 1, wherein the physical layer segment planner module:
   receives service boundary information associated with a service of interest;
   designates segments in a bit stream associated with the service of interest;
   configures the convolutional decoding module to decode the designated segments;
   determines the deinterleaved addresses of the designated segments; and
   provides the deinterleaved addresses to the address filter module.

5. The apparatus of claim 1, wherein the address filter module:
   receives deinterleaved addresses of a service of interest from the physical layer segment planner module;
   selects bits from a bit stream based at least in part on the deinterleaved addresses; and
   stores the selected bits from the bit stream to the memory.

6. The apparatus of claim 5, wherein the convolutional decoding module retrieves the selected bits from the memory for subsequent processing.

7. The apparatus of claim 1, wherein the convolutional decoding module uses Viterbi decoding.

8. The apparatus of claim 1, wherein the memory and the decoder are disposed on a common integrated circuit die.

9. The apparatus of claim 1, wherein the decoder outputs audio data.

* * * * *

UNITED STATES PATENT AND TRADEMARK OFFICE
CERTIFICATE OF CORRECTION

PATENT NO.        : 9,536,535 B2
APPLICATION NO.   : 13/977640
DATED             : January 3, 2017
INVENTOR(S)       : Bi et al.

It is certified that error appears in the above-identified patent and that said Letters Patent is hereby corrected as shown below:

In the Specification

At Column 2, Line 18, "RE unit 110" should be --RF unit 110--.

At Column 2, Line 22, "RE unit 110" should be --RF unit 110--.

At Column 2, Line 35, "RE unit 110" should be --RF unit 110--.

Signed and Sealed this
Ninth Day of May, 2017

Michelle K. Lee
*Director of the United States Patent and Trademark Office*